United States Patent [19]

Takahashi et al.

[11] 4,028,795
[45] June 14, 1977

[54] METHOD OF MANUFACTURING EXTRUDED STRUCTURAL PROFILES FROM ALUMINUM BASED METAL SCRAPS

[75] Inventors: Toshiro Takahashi; Toshihiro Nagano; Katsuhiko Nakamura, all of Shizuoka; Masaru Kikuchi, Fuji, all of Japan

[73] Assignee: Riken Keikinzoku Kogyo Kabushiki Kaishi, Shizuoka, Japan

[22] Filed: July 8, 1975

[21] Appl. No.: 593,996

[30] Foreign Application Priority Data

Dec. 10, 1974    Japan ............................ 49-141893

[52] U.S. Cl. ................................ 29/403; 29/420.5; 72/38; 72/263; 72/270; 29/DIG. 47
[51] Int. Cl.² ................... B21C 23/01; B21C 23/04
[58] Field of Search .............. 29/403, 420.5, 180 E, 29/192 R, DIG. 47; 72/253, 270, 263, 38

[56] References Cited

UNITED STATES PATENTS

| | | | |
|---|---|---|---|
| 1,197,026 | 9/1916 | Hiller | 29/403 |
| 2,358,667 | 9/1944 | Stern | 29/403 |
| 2,391,752 | 12/1945 | Stern | 29/403 |
| 2,738,063 | 3/1956 | Billen | 72/263 |
| 2,954,869 | 10/1960 | Swanson | 72/263 |
| 3,164,253 | 1/1965 | Muller | 72/38 |
| 3,626,578 | 12/1971 | Price et al. | 29/403 |
| 3,643,873 | 2/1972 | George | 29/403 |
| 3,757,410 | 9/1973 | Roberts | 29/420.5 |

FOREIGN PATENTS OR APPLICATIONS

| | | | |
|---|---|---|---|
| 1,030,286 | 5/1958 | Germany | 72/272 |
| 119,528 | 4/1927 | Switzerland | 72/38 |
| 699,163 | 10/1953 | United Kingdom | 72/38 |
| 781,737 | 8/1957 | United Kingdom | 72/263 |
| 28,574 | 12/1911 | United Kingdom | 72/343 |

Primary Examiner—C.W. Lanham
Assistant Examiner—Daniel C. Crane
Attorney, Agent, or Firm—Finnegan, Henderson, Farabow & Garrett

[57] ABSTRACT

Aluminum or aluminum alloy scraps or wastes are broken into chips and converted into a cylindrical body to be extruded under a temperature suitable to produce extruded structural profiles. The method is characterized by the fact that the interior of the extruder is evacuated prior to or simultaneously with the extrusion step so as to exhaust air entrapped in the cylindrical body.

1 Claim, 4 Drawing Figures

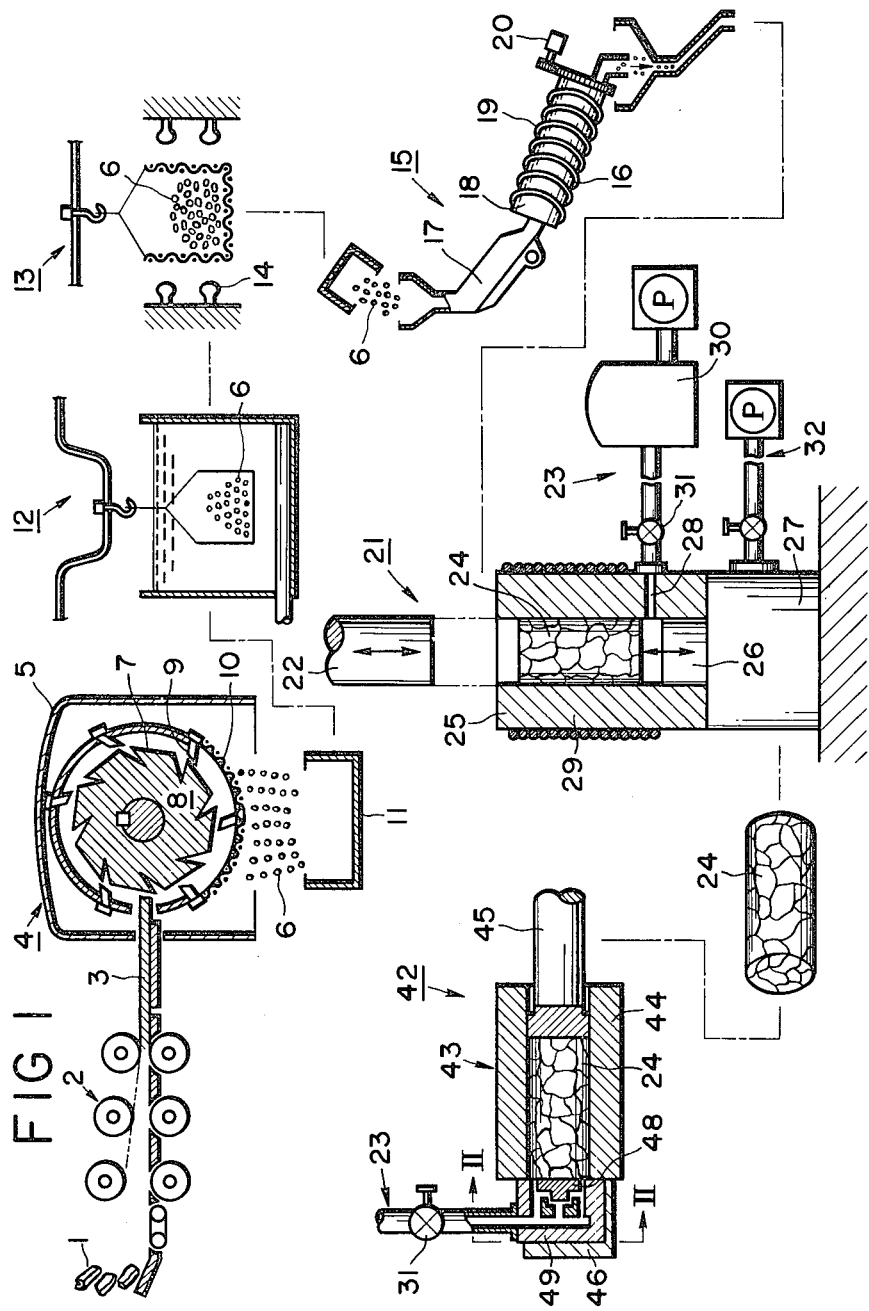

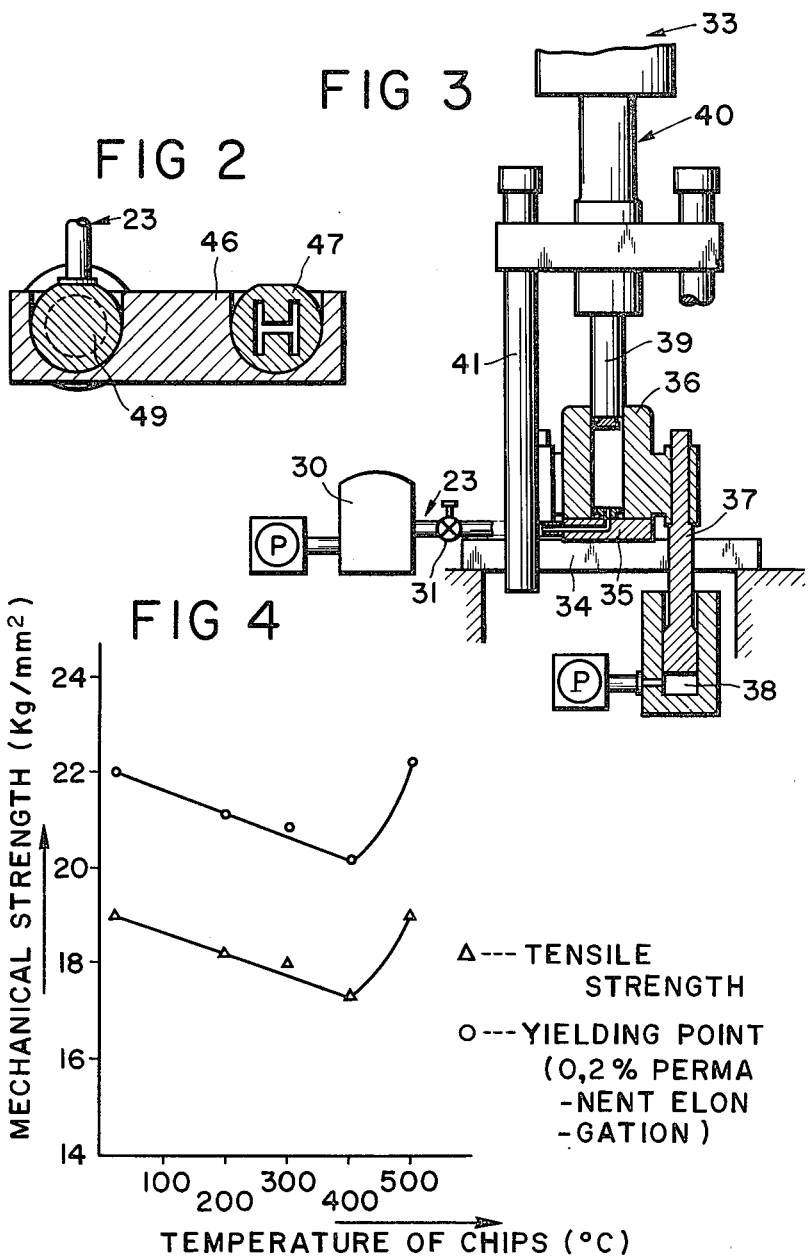

METHOD OF MANUFACTURING EXTRUDED STRUCTURAL PROFILES FROM ALUMINUM BASED METAL SCRAPS

The present invention relates to a method of manufacturing extruded structural profiles from aluminum or aluminum alloy scrap or waste.

Aluminum or aluminum alloy extrusions have found their utility widely in various fields as structural members, for example, in buildings due to their light weight and corrosion-resistance property. Thus, the amount of manufacture of such aluminum of aluminum alloy extrusions has increased year by year. Such increase in production of extrusions causes, as a matter of fact, an increase in the amount of discard or waste produced in extrusion process. Further, remarkable amount of scrap is produced during fabrication and assembling of the extrusions. The total amount of such scrap reaches 20 to 30 percent of the billet weight. Thus, there is an increased need for development of a technique for effective recovery of such scrap and waste.

Known processes for recovering scrap includes steps of melting the scrap and forming into billets, and then extruding the billets through an appropriately shaped mould or die to form extrusions. In the known process, however, it is required to add an adequate amount of virgin metal in the melting step in order to ensure a satisfactory extrudability. Further, the known process is disadvantageous in respect of high electrical power consumption in the melting step as well as heavy metal losses.

Therefore, it has been proposed to extrude aluminum or aluminum alloy scraps directly through a mould to form extruded structural profiles. For example, the U.S. Pat. Nos. 2,391,752 and 2,302,980 issued on Dec. 25, 1945 and Nov. 24, 1942 to Max Stern teach extrusion of aluminum or aluminum alloy scraps directly through the mould. As Stern has recognized in his patent, one of the problems encountered in the directly extruding of aluminum or aluminum alloy scraps is treatment of oxide skins or oxide films coating the scrap pieces. If the extruding pressure is not sufficient to disrupt these oxide skins or films, they will prevent metallic contact of individual scrap pieces resulting in products of less uniformity and less mechanical strength. Thus, Stern proposes in one of his patents to have aluminum and aluminum alloy scraps and wastes subjected to pressure of 3 to 8 tons/in$^2$ in an extruder housing under the temperature of about 300° C in order to loosen the oxide skins and then extruding the scraps and wastes under the pressure of 18 to 40 tons/in$^2$ at a temperature between about 350° to 450° C. The Stern's process has been found effective to solve the problems inherent to the oxide skins existing on the scrap pieces, however, it is not effective to eliminate problems caused by air entrapped in the extruder housing.

Such air entrapped in the extruder housing provides resistance to the movement of extruding ram and forms voids in the extrusions. Thus, existence of air in the extruder housing has adverse effects on the quality and strength of the final products. Further, it is uneasy in actual practice to charge the chip materials into the extruder and control the correct amount of such chip materials which is required for one extrusion stroke. The above charging process is needed to spend a lot of time and this causes the temperature of chip materials to drop below the temperature suitable for hot extrusion.

According to the present invention, there is provided a method of manufacturing extruded structural profiles from aluminum based metal scraps comprising breaking scrap materials in the form of chip materials, charging the chip materials into a press housing, compacting the chip materials into a cylindrical body inserting the heated body into an extruder housing, and extruding the cylindrical body to be shaped into a structural profile under such a condition that air in the extruder is exhausted.

According to the present invention, there is further provided a method of manufacturing extruded structural profiles from aluminum based material scraps comprising breaking scrap materials in the form of chip materials, charging the chip materials into a press housing, forming a cylindrical body by compressing the chip materials in the chip before which air in the press housing has been evacuated, inserting the body into an extruder housing, exhausting air from the extruder housing and extruding the body under a high temperature.

In the process according to the present invention, the evacuation of air contained in the extruder housing is performed before the extrusion starts so that there is no adverse effects of air on the final products. When the specific gravity of the compacted body formed in the press housing approximates the specific gravity of aluminum, it is very important to evacuate air entrapped in the gaps among the chip materials before compacting the chip materials in the press housing. Thus, the disadvantages caused by the existence of air in the cylindrical body and the extruder housing are eliminated completely.

Therefore, the present invention is to provide a method of manufacturing extruded structural profiles from aluminum based material scraps, which eliminate drawbacks caused from the existence of air.

Another object of the present invention is to provide an improved method including the step of compacting the chip materials in the press housing into a cylindrical body prior to an extrusion step.

A further object of the present invention is to provide a method for recovery of scrap materials having relatively long dimensions in length.

A still object of the present invention is to provide a method including the step of proceeding an age hardening of extruded products while baking the paint coated thereon.

The above and other objects and features of the present invention will become apparent from the following descriptions of preferred embodiments taking reference to the accompanying drawings, in which:

FIG. 1 is a diagrammatical sectional view showing the process of the present invention;

FIG. 2 is a view as seen substantially along the line II — II in FIG. I;

FIG. 3 is a fragmentary and partial cross-section view showing an another press machine as may be used in this invention;

FIG. 4 is a diagram showing the relationship between the temperature of chips and the mechanical strength of the extruded profiles.

Referring now to FIG. 1, there is shown a preferred embodiment of the process for manufacturing extrusions from aluminum based metal scrap material produced during extruding and assembling processes. The scrap materials 1 to be recovered are transported to a roller means 2 so as to form them into a laminated plate 3. The plate 3 is forwarded to a crushing station 4 where it is crushed into pieces or chips 6 by means of crusher 5 which may be of a conventional type.

In FIG. 1, the crasher 5 includes a rotor 8 formed with cutter blades 7 on the outer periphery, and a housing having stationary blades 9 for co-operation with the rotating blades 7. The housing is provided at its lower side with a screen or a perforated plate 10 through which the crashed chips 6 fall into a receiving plate 11. It is preferred that the chips 6 have side surface area of approximately 25 mm². The chips 6 are then transferred into washing or cleaning station 12 where they are cleaned to remove oil or other contaminents which may have adverse effect on the final product. Various types of known cleaning agents, such as trichlene vapour or nitric acid may be used for the purpose. When nitric acid is used, the cleaning process is performed by dipping the chips in a 15 percent solution of $HNO_3$ for about 10 to 20 minutes, washing by water, dipping in a 5 percent solution of NaOH at a temperature of about 50° C for about 3 to 5 minutes, dipping again in 15 to 20 percent solution of $HNO_3$ and washing by water. After the washing, the chips 6 are transported to a drying station 13 where they are dried by means of for example an infrared lamp 14 which may be of a conventional type. It is also possible to employ the other means for the purpose.

In the above embodiment, the scrap materials 1 are passed through the roller 2 to convert them into the laminated plate 3. Alternatively, the scrap materials can be inserted directly into the crusher 5 to produce the chip materials 6.

The dried chip materials 6 are transferred to a heating station 15 where they are heated to a temperature suitable for compacting them into a cylindrical body 24, for example, above 300° C. A heating means 16 as used in this embodiment comprises a hopper 17, a cylinder 18 mounted on a suitable support (not shown) to be inclined, a heater 19 surrounding the cylinder and a driving means 20 for rotating the cylinder. The interior of the cylinder 18 is heated by the heater 19 while rotating the same and after that, the dried chip materials 6 are charged into the interior of the cylinder 18 through the hopper 17. The heated chip materials 6, which are heated to a temperature over about 300° C, are transported to a compressing or shaping station 21 where they are compacted into a cylindrically compacted body 24 which are of such a dimension that is suitable for insertion into an extruder 43.

The heat chip materials as charged into a press housing 29 are compacted by a press means 25 so that the density of the compacted cylindrical body 24 is as large as 50 to 99.75 percent of aluminum material density. It will be desired that applying force to the chip materials is about 0.4 to 2 ton/cm². Prior to this process, applied to the interior of the press housing 29 is the suction pressure which is preferably as low as 20 to 50 mm Hg by use of a vacuum device 23. After the air existing in the gap among the chip materials is sucked, the chip materials are compacted in the form of the cylindrical body 24. Therefore, this process does not have any adverse effects on the final products which are caused by the existing of air. When the chip materials are compacted to have air passages therein, it is not always required to evacuate air in the gap among the chip materials to be recovered. As fully mentioned hereinafter, it will be easy to suck air in the gap among the compacted chip materials during the extruding step.

The press device as illustrated in FIG. 1 includes a base plate 27 having a plunger 26, the container or housing 29 encircling the plunger 26 and having a degasing bore 28, a punch 22 actuated by a conventional means (not shown). After charging the chip materials into the housing 29 in which the plunger 26 is positioned below the bore 28, the punch is moved downwardly to seal the top opening of the housing 29. The vacuum means 23 is actuated to suck air among the chip materials in the housing. After completing this evacuation, the plunger 26 is further moved to a position where the side surface of the plunger closes the bore 28 and then the punch 22 is moved downwardly to compact the chip materials into the cylindrical body 24. The cylindrical body thus compacted will be taken out of the housing 29 by further moving the plunger upwardly. It will be preferred to operate the plunger simultaneously with the actuation of the punch 22 so that adequate pressure force is applied to the chip materials. The container 29 may be provided at its peripheral surface with a heater in order to prevent the temperature of the chip materials from dropping.

Alternatively, a press means 33 such as illustrated in FIG. 3 may be employed to form the chip materials into the compacted cylindrical body 24. In this example, a die 35 mounted on a stationary base 34 is communicated with the vaccum means 23 through a bore made in the die. A container 36 is provided to be slidable with a stem 37 along a guide bar 41, which stem is co-operated at its one end with a hydraulic means 38. A pressure ram 39 is able to be inserted into the housing 36 by means of a conventional driving means 40. In this embodiment, the ram 39 is moved downwardly to seal the top opening of the container 36 after charging the chip materials into the housing 36. Then, the vacuum means is operated to decrease the pressure in the housing 36, after that, the ram is moved downwardly to compact the chip materials into the cylindrical body 24. The above operation of compression is completed and then the stem 39 ascends by assist of the hydraulic means 38 along the guide bar 41 so that the compacted body remains onto the die 35. Thus, it is easy to take the compacted body out of the press means 33.

A parting agent may be used to readily separate the compacted body from the housing. Further, the cleaned chip metals can be compacted under the room temperature without heating them. However, in this case, it is necessary to heat the cylindrical body to a temperature suitable for hot extrusion before inserting it into an extruder 43.

The heated cylindrical body 24 is transported to an extrusion station where it is inserted into a housing 44 of the extruder 43. After that, a pressure ram 45 seals air-tightly the opening of the housing 44 and then the vacuum means 23 is actuated to exhaust air in the container 44. Applied to the interior of the container 44 is the suction pressure which is preferably as large as about 20 to 50 mm Hg. A pressure ram 45 is further advanced to apply the pressure force to the cylindrical body in the housing 44, thereby extruding the structural profile under the air exhausting condition.

FIG. 1 shows an example in which a die slide 46 is air-tightly and slidably disposed at the extruding end of the extruder housing 44. The die slide 46 includes an extruder die 47 and a blind die 48 which has a passage communicating with the evacuating or vacuum device 23. As shown in FIG. 2, the die slide 46 carries an evacuating plate 49. After the extruder housing 44 is charged with metal to be extruded, the die ring 49 in the die slide 46 is moved in place so that it is disposed in confronting relationship with the bore of the extruder housing 44. Then, the evacuating device is operated to apply a suction pressure to the interior of the extruder housing. The ram 45 is then actuated to compact the metal in the housing. Thereafter, the die slide 46 is shifted to the position in which the extruding die 47 is placed in the operative position. Then, the ram 45 is further advanced to perform the extruding operation.

It will be understood from FIG. 4 that, when the scrap materials is to be converted directly into the structural profiles, it is important how to heat the chip materials before extruding the same into the structural profiles in order to produce the strong extrusions. FIG. 4 shows the relationship between the temperature of chip materials and the mechanical strength of final products for A6063 aluminum based alloy. From the drawing, it will be seen that a tensile strength and a yielding point (the stress at which 0.2 % permanent elongation is produced) are linearly decreased with the increase in temperature of the chip materials to be extruded and the mechanical strength is minimized when the chip materials are heated to the temperature of about 400° C. It will be further seen that the mechanical strength of the extrusions is increased abruptly when the temperature of the chip materials to be extruded is larger than a certain temperature, that is, about 400° C which means solid solution temperature for solute substance. Thus, it will be noted that the mechanical strength of the extrusions can be adjusted by heating the chip materials to the predetermined temperature and it is important to determine the degree of temperature of the chip materials to obtain the strong extrusions.

The thus extruded structural profiles are then subjected to cooling process as taught by the co-pending U.S. patent application Ser. No. 324,448 filed by Toshiro Takahashi on Jan. 17, 1973, now U.S. patent no. 3,899,370. Thereafter, the products are corrected as necessary, subjected to chemical and mechanical pretreatment, to anodizing and painting. After painting, the extrusions are heated in a furnace so that the paint coatings are baked and at the same time the age hardening is proceeded. It is preferable that the heating is performed under the temperature of 205° C ± 5° C for 50 to 120 minutes or 190° C ± 10° C for 20 to 50 minutes. Through the heating, intermetal compounds such as $Mg_2Si$ can uniformly be produced in the extrusion so that is is possible to obtain aluminum alloy extrusions similar to those produced from casted billets.

The invention has thus been shown and described with reference to preferred embodiments, however, it should be noted that the invention is in no way limited to the details of the illustrated embodiments but changes and modifications may be made without departing from the scope of the appended claims.

What we claim is:

1. A method of manufacturing extruded structural profiles from aluminum based metal scrap materials comprising;

passing and lapping the aluminum based scrap materials through and between rollers to form a laminated sheet plate, breaking the laminated sheet plate into chip materials, heating the chip materials to a temperature sufficient to effect a hot press and a hot extrusion, charging the heated chip materials into a press housing, evacuating the interior of the press housing to exhaust air from between and about the chip materials, compacting the chip materials into a substantially cylindrical body in the press housing by applying a pressure force to the chip materials in the press housing in the range of about 0.4 to 2 ton/cm$^2$, the cylindrical body having a density greater than 70 percent of that of an aluminum material, inserting the compacted body of chip materials into an extruder housing, disposing a blind die in air-tight relation with the extruder housing, evacuating air from in and about the body of chip materials and in the extruder housing while the blind die lies in such air-tight relation with the extruder housing so that the reduced pressure in the housing is in the range of about 20 to 50 mmHg.

replacing the blind die by an open die having a desired extruder opening therein under the evacuated condition in the interior of the housing, compressing the cylindrical body into a semi-solid consolidation body to be deformed in air-tight contact with the extruder housing, and extruding the semi-solid consolidation body through the extruder die opening to form the desired shape.

* * * * *